United States Patent
Kelkar et al.

(10) Patent No.: US 12,430,186 B2
(45) Date of Patent: Sep. 30, 2025

(54) HARDWARE ACCELERATOR SERVICE AGGREGATION

(71) Applicant: Google LLC, Mountain View, CA (US)

(72) Inventors: Shrikant Kelkar, San Jose, CA (US); Gargi Adhav, San Jose, CA (US); Lakshmi Sharma, Saratoga, CA (US); Manoj Jayadevan, Cupertino, CA (US); Parveen Patel, Cupertino, CA (US); Parthasarathy Ranganathan, San Jose, CA (US)

(73) Assignee: Google LLC, Mountain View, CA (US)

( * ) Notice: Subject to any disclaimer, the term of this patent is extended or adjusted under 35 U.S.C. 154(b) by 649 days.

(21) Appl. No.: 17/525,300

(22) Filed: Nov. 12, 2021

(65) Prior Publication Data

US 2023/0153159 A1    May 18, 2023

(51) Int. Cl.
  *G06F 9/50* (2006.01)
  *G06F 9/38* (2018.01)
  *G06F 9/48* (2006.01)

(52) U.S. Cl.
  CPC .......... *G06F 9/5088* (2013.01); *G06F 9/3877* (2013.01); *G06F 9/48* (2013.01);
  (Continued)

(58) Field of Classification Search
  CPC ........ G06F 9/48; G06F 9/4806; G06F 9/4843; G06F 9/485; G06F 9/4856; G06F 9/4881;
  (Continued)

(56) References Cited

U.S. PATENT DOCUMENTS 6,633,898 B1    10/2003    Seguchi et al.
10,102,035 B2   10/2018    Bartfai-Walcott et al.
(Continued)

FOREIGN PATENT DOCUMENTS

EP    3731091 A1    10/2020
JP    2021528740 A  10/2021

OTHER PUBLICATIONS

International Search Report and Written Opinion for International Application No. PCT/US2022/047988 dated Jan. 30, 2023. 13 pages.
(Continued)

*Primary Examiner* — Charles M Swift
(74) *Attorney, Agent, or Firm* — Lerner David LLP

(57) ABSTRACT

The present disclosure includes systems, methods, and computer-readable mediums for discovering capabilities of local and remote hardware (HW) accelerator cards. A local hardware (HW) accelerator card may provide, via a communication interface, a listing of acceleration services from the local HW accelerator card. The listing of acceleration services may include a first set of acceleration services provided by one or more accelerators of the local HW accelerator card and a second set of acceleration services provided by one or more accelerators of a remote HW accelerator card. A workload instruction defining a workload for processing by at least one of the acceleration services of the second set of acceleration services may be received from a processor of a computing device. The workload instruction may be forwarded to the remote HW accelerator card.

15 Claims, 8 Drawing Sheets

(52) U.S. Cl.
CPC .......... G06F 9/4806 (2013.01); G06F 9/4843 (2013.01); G06F 9/485 (2013.01); G06F 9/4856 (2013.01); G06F 9/4881 (2013.01); G06F 9/50 (2013.01); G06F 9/505 (2013.01); G06F 9/5061 (2013.01); G06F 9/5083 (2013.01)

(58) Field of Classification Search
CPC .......... G06F 9/50; G06F 9/5044; G06F 9/505; G06F 9/5061; G06F 9/5083; G06F 9/5088; G06F 2209/509
See application file for complete search history.

(56) References Cited

U.S. PATENT DOCUMENTS

| | | | |
|---|---|---|---|
| 10,175,991 | B2 | 1/2019 | Biran et al. |
| 10,324,873 | B2 | 6/2019 | Kaushik et al. |
| 10,365,830 | B2 | 7/2019 | He et al. |
| 11,321,907 | B1 * | 5/2022 | Dagani .................. G06F 8/443 |
| 2011/0320739 | A1 | 12/2011 | Ragunathan et al. |
| 2018/0307499 | A1 * | 10/2018 | Chen ....................... G06F 15/76 |
| 2019/0004871 | A1 * | 1/2019 | Sukhomlinov ........ G06F 9/5038 |
| 2020/0026575 | A1 * | 1/2020 | Guim Bernat ...... G06F 9/45558 |
| 2020/0028921 | A1 | 1/2020 | Cai et al. |
| 2020/0142753 | A1 | 5/2020 | Harwood et al. |
| 2020/0177481 | A1 * | 6/2020 | Venkatesh ........... H04L 43/0817 |
| 2020/0218684 | A1 | 7/2020 | Sen et al. |
| 2020/0341810 | A1 * | 10/2020 | Ranganathan .......... G06F 9/505 |

OTHER PUBLICATIONS

Extended European Search Report for European Patent Application No. 22156098.0 dated Aug. 23, 2022. 8 pages.
Notice of Grant for Japanese Patent Application No. 2023-572177 dated Feb. 4, 2025. 3 pages.
Intention to Grant for European Patent Application No. 22156098.0 dated Aug. 12, 2025. 9 pages.
Interoperable Naming Service Specification. Object Management Group (OMG). Nov. 2000, 43 pages.
Paniagua et al. System of Systems integration via a structured naming convention. 2019. IEEE 17th International Conference on Industrial Informatics (INDIN), Helsinki, Finland. pp. 132-139.

* cited by examiner

HARDWARE ACCELERATOR SERVICE AGGREGATION

BACKGROUND

In most systems, it is difficult for a computing device, including the components of the computing device and/or the software executing on the computing device, including the operating system, to discover the functionality and capabilities provided by hardware accelerator cards connected to the computing device by a communication interface, such as a PCIe bus. To avoid these issues, processors may be hardcoded with software, such as drivers, to communicate with particular hardware accelerator cards. However, hardcoding processors with the necessary software to communicate with particular hardware accelerator cards limit the processors to only those particular hardware accelerator cards. Thus, processors are not able to leverage the functions and capabilities of other hardware accelerator cards or hardware accelerator cards that were developed after the processor was produced.

Additionally, some hardware accelerator cards may expose their functionalities and capabilities as separate devices within the operating system of a computing device. In this regard, when a hardware accelerator card is connected to a computing device by a communication interface, such as a PCIe bus, the operating system may detect or otherwise be notified of the connection and list each function and capability of the hardware accelerator card as discrete devices within the operating system according to predefined classes and subclasses. Based on the devices listed in the operating system, the computing device may use the capabilities and functionalities of the hardware accelerator card.

As the capabilities and functionalities of hardware accelerator cards have increased and become more specialized, these new capabilities and functionalities are not clearly identified by the classes and subclasses provided for by current operating systems. Thus, some operating systems may indicate the capabilities and functionalities provided by hardware accelerator cards but may not be able to identify all of the capabilities and functionalities of the hardware accelerator cards. Further, some of the capabilities and functionalities of the hardware accelerator cards may not be recognized and/or clearly identified within the operating systems. As such, computing devices may not be able to leverage or even be made aware of all of the features and capabilities of available hardware accelerator cards.

Systems are typically provided with a limited number of connections to a communication interface. For instance, systems that include PCIe buses may only have a few PCIe slots that connect hardware accelerator cards to the PCIe buses. The limited number of connections may be due to cost constraints. In this regard, each additional connection added to a system may increase physical hardware expenses and add to the overall manufacturing costs. In addition, technical limitations, such as power availability, may also limit the number of devices that may be connected to a system. For example, a system may include five connections for hardware accelerator cards; however, the power supply may only be able to provide power to two hardware accelerator cards at a time. Thus, systems may be limited in their ability to access acceleration services offered by hardware accelerator cards due to the limited number of hardware accelerator cards that may be connected to the systems.

BRIEF SUMMARY

The technology described herein relates to systems and methods for service aggregation that aggregates and exposes acceleration services provided by accelerators of hardware accelerator cards. With service aggregation, a hardware accelerator card may communicate with other hardware accelerator cards to aggregate and expose the accelerations services provided by accelerators of these other hardware accelerator cards that may be connected locally or remotely. The aggregated and exposed acceleration services may also include acceleration services offered by the accelerators of the hardware accelerator card performing the service aggregation. The acceleration services offered by the hardware accelerator card, as well as other locally or remotely connected hardware accelerator cards may then be leveraged by the system.

One aspect of the disclosure relates to a method. The method may comprise providing, by one or more processors of a local hardware (HW) accelerator card, via a communication interface, a listing of acceleration services from the local HW accelerator card, the listing of acceleration services including a first set of acceleration services provided by one or more accelerators of the local HW accelerator card and a second set of acceleration services provided by one or more accelerators of a remote HW accelerator card; receiving, by the one or more processors, a workload instruction from a processor of a computing device, the workload instruction defining a workload for processing by at least one of the acceleration services of the second set of acceleration services; and forwarding, by the one or more processors, the workload instruction to the remote HW accelerator card.

Another aspect of the disclosure relates to a system comprising a communication interface; a local hardware (HW) accelerator card including one or more processors and one or more accelerators. The one or more processors may be configured to receive via the communication interface, a listing of acceleration services from the local HW accelerator card, the listing of acceleration services including a first set of acceleration services provided by one or more accelerators of the local HW accelerator card and a second set of acceleration services provided by one or more accelerators of a remote HW accelerator card; receive a workload instruction from a processor of a computing device, the workload instruction defining a workload for processing by at least one of the acceleration services of the second set of acceleration services; and forward the workload instruction to the remote HW accelerator card.

Another aspect of the disclosure relates to a non-transitory, tangible computer-readable storage medium on which computer-readable instructions of a program are stored, the instructions, when executed by one or more computing devices, cause the one or more computing devices to perform a method. The method may include providing, by one or more processors of a local hardware (HW) accelerator card, via a communication interface, a listing of acceleration services from the local HW accelerator card, the listing of acceleration services including a first set of acceleration services provided by one or more accelerators of the local HW accelerator card and a second set of acceleration services provided by one or more accelerators of a remote HW accelerator card; receiving, by the one or more processors, a workload instruction from a processor of a computing device, the workload instruction defining a workload for processing by at least one of the acceleration services of the second set of acceleration services; and forwarding, by the one or more processors, the workload instruction to the remote HW accelerator card.

In some examples, a processed workload may be received from the remote HW accelerator card, the processed workload being the workload after processing by the at least one of the acceleration services of the second set of acceleration services.

In some instances, the processed workload may be forwarded to the processor of the computing device.

In some examples, the listing of acceleration services is generated by an accelerated services manager (ASM) executing on the one or more processors.

In some instances, the ASM executing on the one or more processors communicates with another ASM executing on the remote HW accelerator card.

In some instances, the ASM forwards the workload instruction to the other ASM.

In some instances, the ASM requests a listing of the second set of acceleration services from the other ASM.

In some instances, the ASM identifies and prunes unhealthy acceleration services from the listing of acceleration services.

In some examples, identifying the unhealthy acceleration services includes: determining, by the ASM, a failure to process the workload instruction by the at least one of the acceleration services of the second set of acceleration services.

In some examples, pruning the unhealthy acceleration services includes: marking the at least one of the acceleration services of the second set of acceleration services as unhealthy; or removing the at least one of the acceleration services of the second set of acceleration services from the listing of acceleration services.

In some instances, after determining the failure to process the workload instruction, sending, by the ASM, an updated workload instruction to a different HW accelerator card for processing by at least one of the acceleration services of the different HW accelerator.

In some instances, the workload instruction further defines processing by at least one acceleration service of at least one other remote HW accelerator card.

DETAILED DESCRIPTION

Figure 1:
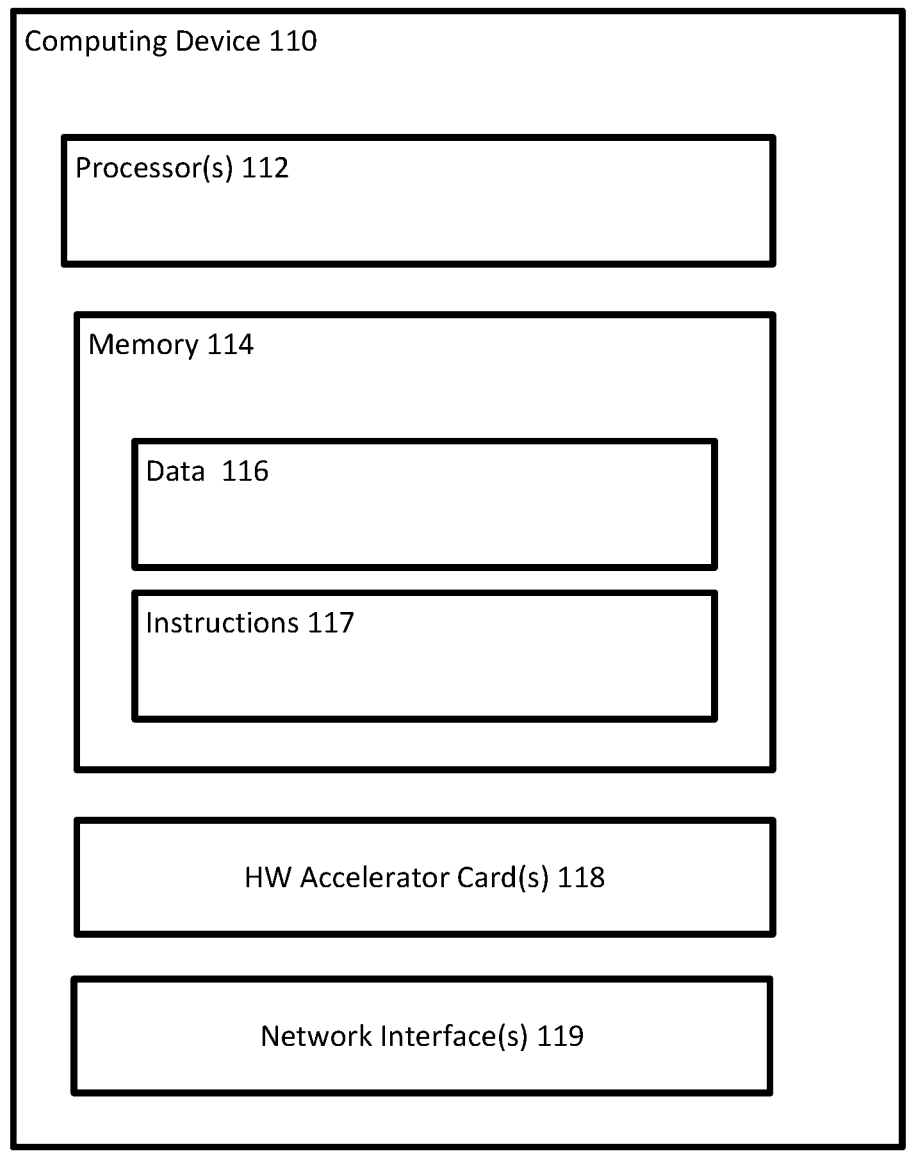
FIG. 1 is an illustration of an example system in accordance with aspects of the present disclosure.

The technology described herein relates to systems and methods for service aggregation that aggregates and exposes acceleration services provided by accelerators of hardware (HW) accelerator cards. With service aggregation, a HW accelerator card attached to a computer device may be able to serve and expose acceleration services from locally and remotely connected HW accelerator cards to the computing device. As further described herein, software executing on a compute core of the HW accelerator card in a computing device may discover or use a pre-configuration file to communicate with other HW accelerator cards locally connected to the computing device via a communication interface and/or other HW accelerator cards that are remotely networked to the computing device. The computing device may then communicate with the other HW accelerator cards through the HW accelerator card attached to the computing device. As such, the computing device may take advantage of the acceleration services of any number of locally or remotely connected HW accelerator cards.

To overcome the deficiencies of discovering acceleration services, the technology described herein uses a standardized listing of identifiers that correspond to acceleration services that can be provided by the accelerators on HW accelerator cards. In this regard, each HW accelerator card may store a listing of identifiers that correspond to the acceleration services provided by the accelerators on that card. As the identifiers can provide more granularity than the device classes and subclasses currently used, processors which retrieve the listings from the HW accelerator cards will be able to determine and leverage more accelerator services offered by the accelerators on the HW accelerator cards.

As used herein, the term "acceleration services" refers to the capabilities and functionalities offered by accelerators of a HW accelerator card. References to "acceleration services" of a HW accelerator card refer to the acceleration services of the accelerators on that HW accelerator card. Acceleration services may include capabilities and functionalities that an accelerator can leverage to control the processing of data, referred to herein as control-plane acceleration services. Acceleration services may also include capabilities and functionalities that an accelerator can leverage to process the data, referred to herein as data-plane acceleration services. For example, an accelerator can support acceleration services that provide controls and/or policies for sharing memory between memory on the host (the computing device) and the accelerator. This control-plane acceleration service can be identified and communicated as an acceleration service.

As each HW accelerator card may have many accelerators, each HW accelerator may provide many acceleration services having the same and/or different capabilities and functionalities. Further, each accelerator may include more than one function and capability.

Example Systems

FIG. 1 depicts an example architecture of a computing device 110 in which the features described herein may be implemented. This example should not be considered as limiting the scope of the disclosure or usefulness of the features described herein. Computing device 110 may be a server, personal computer, or other such system. The architecture of the computing device 110 includes a processor 112, memory 114, and a hardware accelerator card 118.

The processor 112 may include one or more general-purpose processors, such as a Central Processing Unit (CPU), and/or one or more special-purpose processors, such as application-specific integrated circuits (ASICs), field-programmable gate arrays (FPGAs), etc. The processor 112 may be of any type including but not limited to one or more microprocessors (uP), one or more microcontrollers (uC), one or more digital signal processors (DSP), or any combination thereof. The processor may include one or more levels of caching, one or more processor cores, and one or more registers. Each processor core may include an arithmetic logic unit (ALU), a floating-point unit (FPU), a digital signal processing core (DSP Core), or any combination thereof. The processor 112 may be configured to execute computer-readable program instructions that may be contained in a data storage, such as instruction 117 stored in memory 114, and/or other instructions as described herein.

The memory 114 can store information accessible by the processor 112, including instructions 117 that can be executed by the processor 112. Memory can also include data 116 that can be retrieved, manipulated, or stored by the processor 112. The memory 114 may be a type of non-transitory computer-readable medium capable of storing information accessible by the processor 112, such as a hard drive, solid-state drive, tape drive, optical storage, memory card, ROM, RAM, DVD, CD-ROM, write-capable, and read-only memories.

The instructions 117 can be a set of instructions executed directly, such as machine code, or indirectly, such as scripts, by the processor 112. In this regard, the terms "instructions," "steps," and "programs" can be used interchangeably herein. The instructions 117 can be stored in object code format for direct processing by the processor 112, or other types of computer language including scripts or collections of independent source code modules that are interpreted on demand or compiled in advance.

The data 116 can be retrieved, stored, or modified by the processor 112 in accordance with the instructions 117 or other such instructions. For instance, although the system and method are not limited by a particular data structure, the data 116 can be stored in computer registers, in a distributed storage system as a structure having a plurality of different fields and records, or documents, or buffers. The data 116 can also be formatted in a computer-readable format such as, but not limited to, binary values, ASCII or Unicode. Moreover, the data 116 can include information sufficient to identify relevant information, such as numbers, descriptive text, proprietary codes, pointers, references to data stored in other memories, including other network locations, or information that is used by a function to calculate relevant data.

The computing device may further include a hardware (HW) accelerator card 118. The hardware accelerator card 118 may be any device configured to efficiently process particular types of tasks. Some examples of HW accelerator cards include network accelerator cards, video transcoding accelerator cards, security function accelerator cards, cryptography accelerator cards, sound processing accelerator cards, artificial intelligence accelerator cards, etc. Each of these HW accelerator cards may be configured to provide particular acceleration services such as compression, encryption, transcoding, hash generation, graphic processing, simulation, etc. Some HW accelerator cards may be configured to provide multiple acceleration services such as compression and encryption or any other combination of acceleration services.

The computing device 110 may also include a network interface card 119. The network interface card may be any device capable of directly and indirectly communicating with other nodes of a network, such as network 470 described herein with reference to FIG. 4.

Although FIG. 1 functionally illustrates the processor 112, memory 114, HW accelerator cards 118, and network interfaces 119 as being within the same block, the processor 112, memory 114, HW accelerator cards 118, and network interfaces 119 may or may not be stored within the same physical housing. For example, some of the instructions 117 and data 116 can be stored on a removable CD-ROM and others within a read-only DRAM chip. Some or all of the instructions and data can be stored in a location physically remote from, yet still accessible by, the processor 112. Further, although FIG. 1 illustrates computing device 110 as including only one processor 112, memory, 114, network interface 119, and HW accelerator card 118, the computing device 110 may include any number of processors, memory, network interfaces, and HW accelerator cards. Similarly, the processor 120 can actually include a collection of processors, which may or may not operate in parallel.

Figure 2:
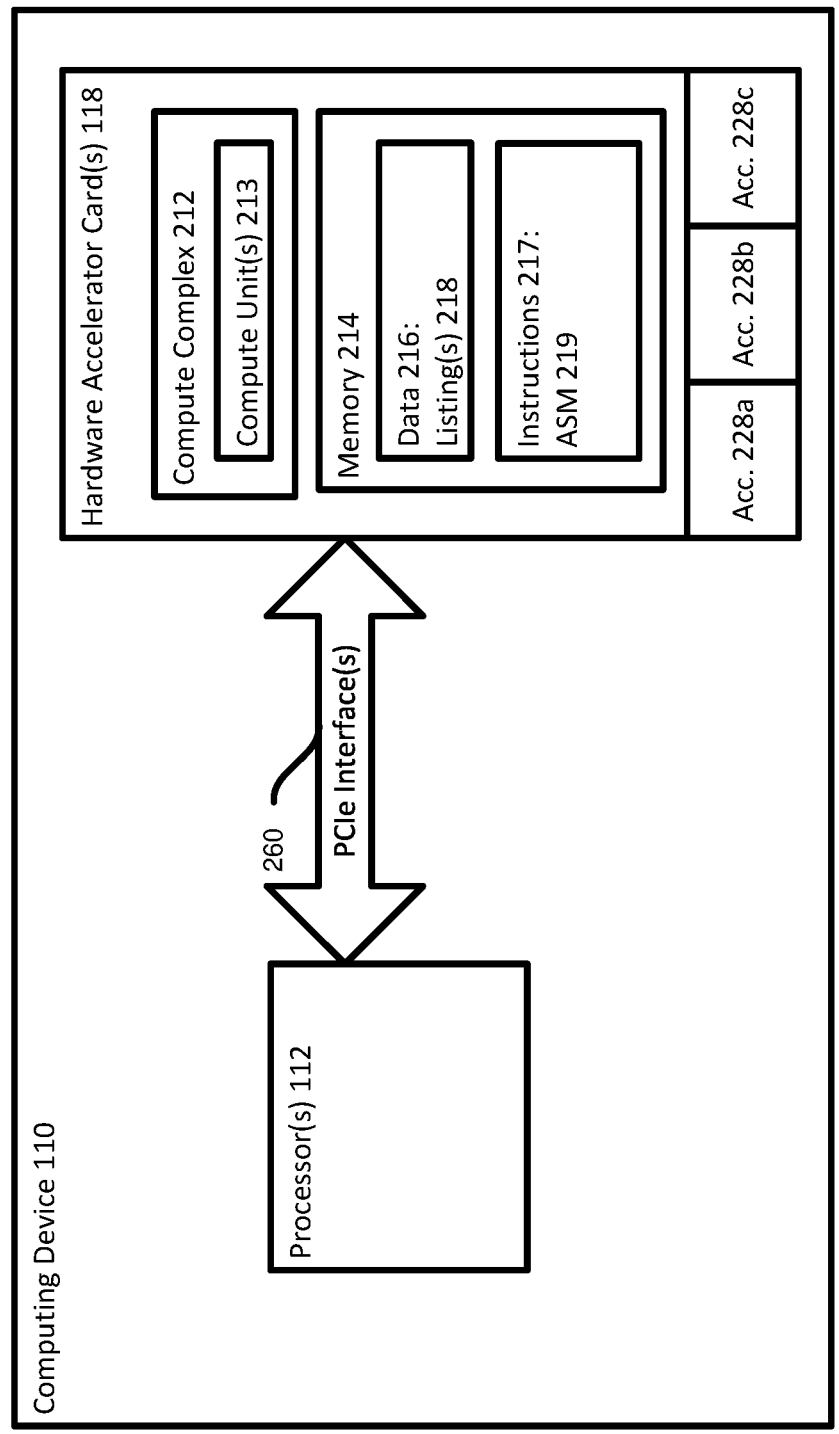
FIG. 2 is another illustration of an example system in accordance with aspects of the present disclosure.

Referring to FIG. 2., the HW accelerator card 118 may include a compute complex 212, memory 214, and accelerators 228*a*, 228*b*, and 228*c*. The compute complex may include one or more compute units 213. The compute complex may control the general operation of the other components of the hardware accelerator, such as by distributing processing tasks amongst the accelerators 228*a*-228*c* and communicating with other devices in computing device 110, such as processor 112. In some instances, the compute complex may coordinate, or otherwise assist with, service aggregation, as described herein.

The one or more compute units of the compute complex 212 may comprise one or more general-purpose processors and/or special-purpose processors. Typically, the compute units 213 of a hardware accelerator card may be one or more special-purpose processors, such as application-specific integrated circuits (ASICs), field programmable gate arrays (FPGAs), etc., capable of executing ARM or MIPS based instruction sets, although other instruction sets may be used. In some instances, compute units 213 may be commercially available processors.

The accelerators 228*a*-228*c* may each be comprised of one or more processors capable of providing particular acceleration services. For example, each accelerator may be configured to provide particular acceleration services such as compression, encryption, transcoding, hash generation, graphic processing, simulation, etc. Some HW accelerator cards may be configured to provide multiple acceleration services such as compression and encryption, or any other combination of acceleration services. The one or more processors of the accelerators may be one or more special purpose processors, such as application specific integrated circuits (ASICs), field programmable gate arrays (FPGAs), specialized processors, etc. used. Although three accelerators are illustrated in FIG. 2, including accelerators 228*a*-228*c*, HW accelerator cards may include any number of accelerators. As previously explained, each individual accelerator may be configured to provide more than one acceleration service (e.g., more than one function and/or capability).

Referring again to FIG. 2, the HW accelerator card includes memory 214. The memory 214 may be compared to memory 114 in that it may be any type of non-transitory computer readable medium capable of storing information accessible by the processor 120, such as a hard-drive, solid state drive, tape drive, optical storage, memory card, ROM, RAM, DVD, CD-ROM, write-capable, and read-only memories. Memory 214 may store information accessible by the compute complex 212 and/or accelerators 228*a*-228*c*, including instructions 217 that can be executed by the compute units 213 of compute complex 212 and/or accelerators 228*a*-228*c*. Although not shown, each accelerator 228-228*c* may have its own memory and/or a pool of shared memory for storing data and instructions for execution of tasks assigned by the compute complex 212.

The instructions 217 may include an Accelerated Services Manager (ASM) program 219. As described further herein, the ASM 219 may be executed by the one or more compute units 213 of the compute complex to control, or otherwise assist with, service aggregation of HW accelerator card 118.

The data 216 within memory 214 can be retrieved, stored or modified by the compute complex 212 and/or accelerators 228a-228c in accordance with the instructions 217 or other such instructions. As further illustrated in FIG. 2, the data 216 may include one or more accelerations service listing 218. The acceleration service listing 218 may contain a list of the acceleration services provided by each accelerator 228a-228c. Acceleration service listings 218 may be in a standardized form. In this regard, each particular acceleration service may be assigned a particular, unique identifier. All accelerators that have a certain acceleration service would include the unique identifier associated with that certain acceleration service in the listing of acceleration services.

Figure 3:
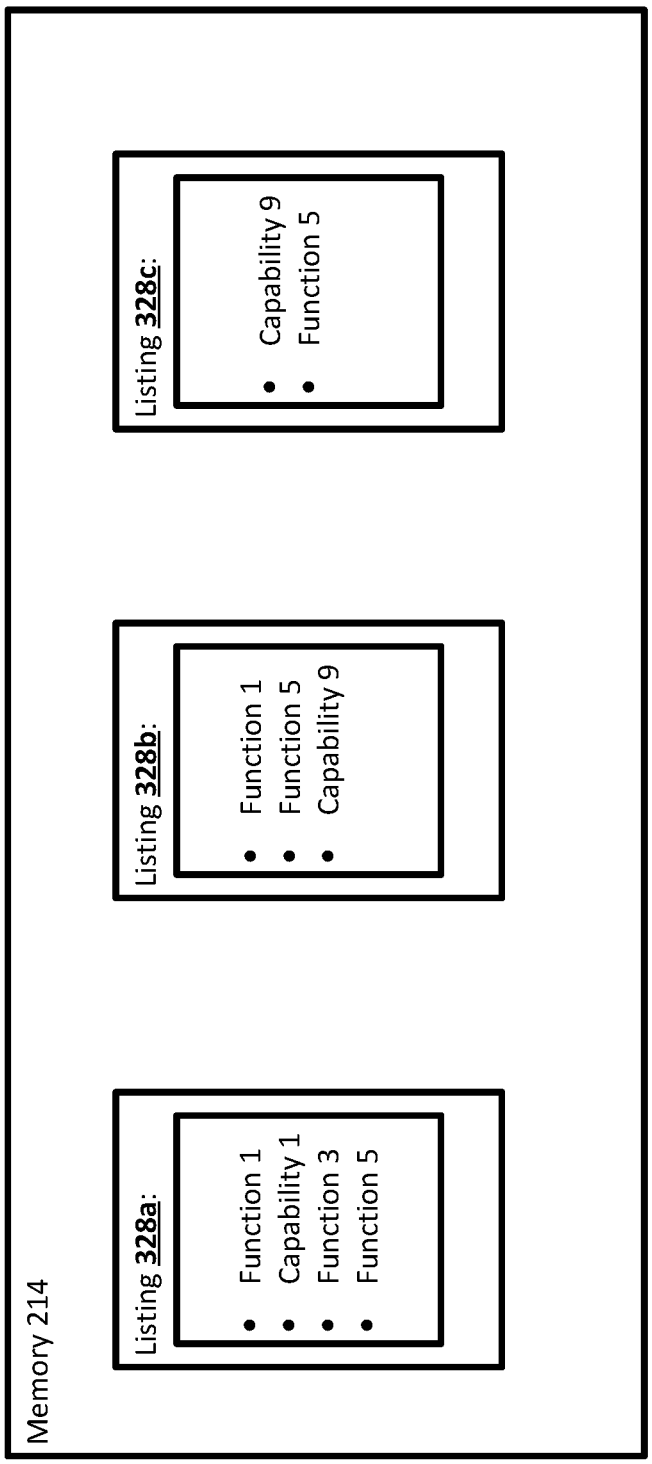
FIG. 3 is an illustration of an example listing of acceleration services in accordance with aspects of the present disclosure.

FIG. 3 illustrates example listings 328a-328c which correspond to accelerators 228a-228c, respectively, as stored within memory 214. In this regard, memory 214 includes a listing for each accelerator on the HW accelerator card 118. As illustrated, listing 328a identifies the acceleration services provided by accelerator 228a, as identified by unique identifiers including Function 1, Capability 1, Function 3, and Function 5. Similarly, accelerator 228b is capable of providing three acceleration services, and each acceleration service is identified within listing 328b by its unique identifier, including Function 1, Function 5, and Capability 9. Accelerator 228c is capable of providing two acceleration services. Each of these two acceleration services is identified in listing 328c by unique identifiers including Capability 9 and Function 5.

As further illustrated in FIG. 3, accelerators that provide a common acceleration service may be associated with the same unique identifier in their respective listings. For instance, Function 1 is the unique identifier associated with a particular function capable of being performed by accelerators 228a and 228b. Thus, listings 328a and 328b contain the same unique identifier Function 1. Similarly, Capability 9 is the unique identifier associated with a particular capability of accelerators 228b and 228c. Thus, listings 328b and 32c contain the same unique identifier of Capability 9. The unique identifiers in FIG. 3 are merely examples of possible identifiers. Identifiers may include any value or other such indicator, including numbers, letters, symbols, etc.

The listings 328a-328c are examples of a possible format for listing unique identifiers associated with accelerators of the HW accelerator card 118. In some examples, the listings of accelerators may be stored in a combined listing, such as a spreadsheet or database. For example, the combined listing may identify each accelerator and the unique identifiers associated with the acceleration services provided by that accelerator. Similarly, the listing may be grouped according to accelerators. For instance, a first listing may include a combined listing for a first set of accelerators and a second listing may include a combined listing for a second set of accelerators. Other data may also be included in the listings. Although FIG. 2 and FIG. 3 illustrate the listings as being stored on memory 216, the listings may be stored on the memory of one or more accelerators.

Although not illustrated, a manager may maintain a repository of acceleration services and associated unique identifiers for the acceleration services. The manager may be an individual(s), a company, a collection of companies, a standards organization(s), etc. In addition to maintaining the repository, the manager may also assign the unique identifiers to each acceleration service and add additional acceleration services and corresponding unique identifiers when developed, received, or otherwise requested. By providing a repository of acceleration services and associated unique identifiers, the identifiers used to indicate acceleration services may be consistent across HW accelerator cards, even when the HW accelerator cards are manufactured by different vendors.

Referring again to FIG. 2, the processor 112 may communicate directly with the hardware accelerator card 118 using a communication interface and protocol. For example, the processor(s) 112 may communicate with the hardware accelerator card(s) using PCIe interface 260. Although FIG. 2 illustrates a PCIe interface 260, other communication interfaces and protocols may be used. For example, the processor(s) 112 may communicate with the HW accelerator card(s) 118 using one or more of a CAN interface and protocol, an SPI interface and protocol, a USB interface and protocol, an eSPI interface and protocol, an Ethernet interface and protocol, an IDE interface and protocol, or any other such interface and protocol.

Communication between devices over the communication interface, such as processor 112 and HW accelerator card 118 over PCIe interface 260 may be controlled via an operating system executing on the computing device 110. In this regard, the operating system may setup a handle to provide a communication channel between devices attached to the PCIe interface 260. In some instances, the operating system may also close communication channels between different devices connected to the PCIe interface 260.

Although not shown in FIG. 1 or 2, the computing device 110 may include other components normally found in a personal computer and/or server such as a display device, for example, a monitor having a screen, a projector, a touchscreen, a small LCD screen, a television, or another device such as an electrical device that can be operable to display information processed by processor 112. Computing device 110 may also include speakers. Computing device 110 may also include one or more user input devices, such as a mouse, keyboard, touch screen, microphone, etc. The computing device 110 may also include hardware for connecting some or all of the aforementioned components together with one another.

Figure 4:
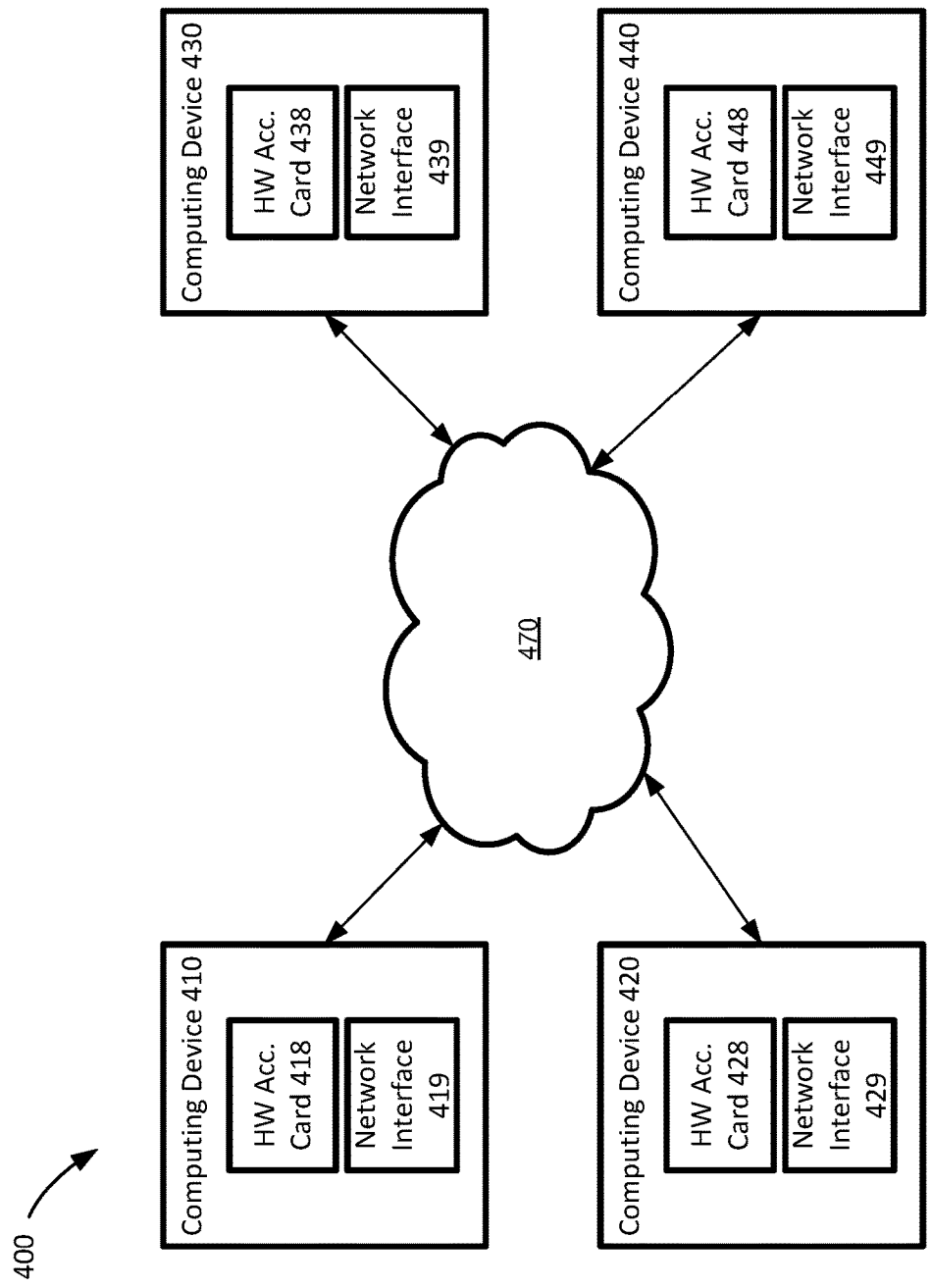
FIG. 4 is an illustration of an example networked system in accordance with aspects of the present disclosure.

FIG. 4 illustrates a networked computing system 400 including computing devices 410, 420, 430, 440 connected together via network 370. Each of computing devices 310-340 may be compared to computing device 110. For clarity, FIG. 4 illustrates computing devices 410-440 as including HW accelerator cards 418, 428, 438, 448, and network interface cards 419, 429, 439, 449, respectively. However, each computing device 410-440 may include the same or different components as computing device 110, such as one or more processors, memory, HW accelerator cards, and/or network interfaces, as well as other components typically found within or otherwise connected to a computer.

The network 470 may include various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information. Each computing device 410-440 may communicate with the other computing devices via the network 470. In some instances, the network 470 may be configured to allow communication between only subsets of computing devices. For instance, computing device 410 may be capable of communicating with computing devices 420 and 430 over network 470, but not computing device 440. Further, although FIG. 4 illustrates only four computing devices connected via network 470, a networked computing system may include any number of computing devices and networks.

Figure 5:
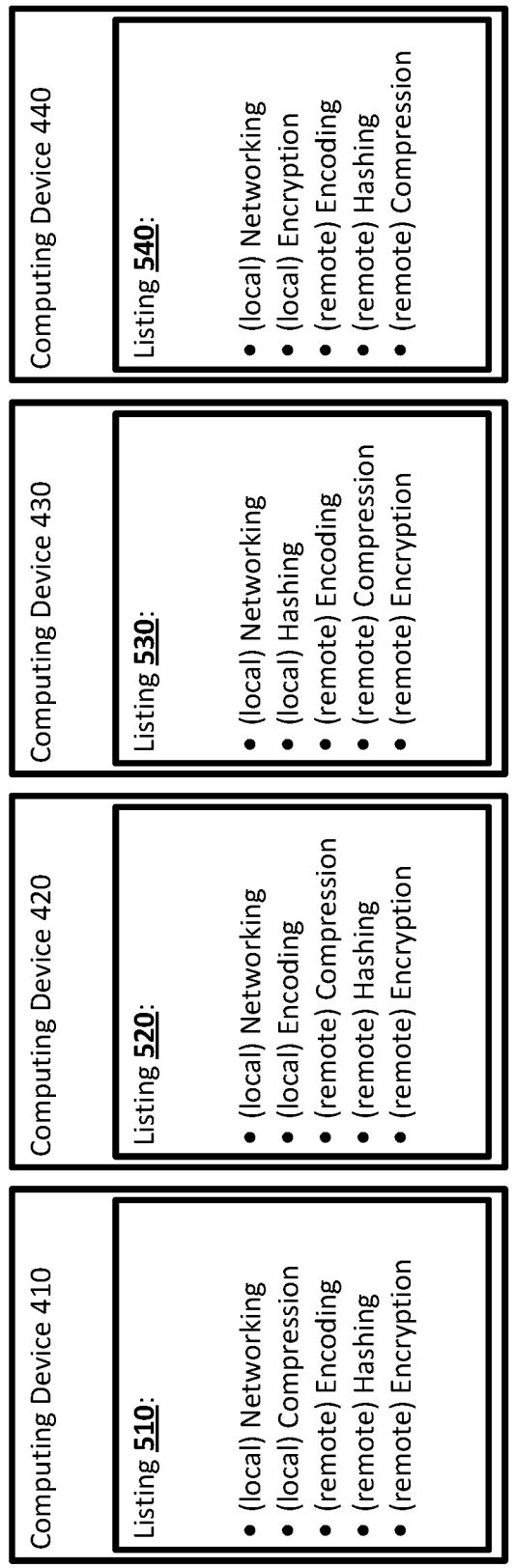
FIG. 5 is another illustration of an example listing of acceleration services in accordance with aspects of the present disclosure.

FIG. 5 illustrates example acceleration service listings 510-540 of acceleration services provided by HW accelerators in computing devices 410-440, respectively. Like listings 328a-328c in FIG. 3, which identify the acceleration services provided by accelerators of computing device 110, acceleration service listings 510-540 include the capabilities and functionalities provided by accelerators of HW accelerator cards 418-448 within computing devices 410-440, respectively. Each acceleration service provided by an accelerator of a HW accelerator card attached to a communication interface of a computing device is identified with a "(local)" label. For instance, the HW accelerator card 418 within computing device 410 may provide networking and compression acceleration services. Similarly, the HW accelerator card 428 within computing device 420 may provide networking and encoding acceleration services, the HW accelerator card 438 within computing device 430 may provide networking and hashing acceleration services, and the HW accelerator card 448 within computing device 440 may provide networking and encryption services.

Listings 510-540 also include the acceleration services of other computing devices on the network 470 identified via service aggregation. These remotely available acceleration services are identified in FIG. 5 with a "(remote)" label. For instance, listing 510 identifies encoding provided by a HW accelerator card within computing device 20, hashing provided by a HW accelerator card within computing device 30, and encryption provided by a HW accelerator card within computing device 40 as aggregated acceleration services available to computing device 10. Although FIG. 5 illustrates each computing device as being able to use all acceleration services provided by all connected computing devices, in some instances, acceleration services provided by a remote device may be blocked from remote access. For instance, computing device 40 may prevent the local encryption acceleration service from being made available by service aggregation.

The acceleration service listing of each computing devices may be generated by ASM software running on one or more HW accelerator cards. For example, during the initialization of a HW accelerator card, such as HW accelerator card 418 of computing device 410, the compute complex of the HW accelerator card may execute the ASM. The ASM may prepare a listing of acceleration services that may be served through HW accelerator card, including local and remote acceleration services. This acceleration service listing may be provided by an operating system executing on computing device 410 or from a configuration file stored within memory on the HW accelerator card 418, computer device 410, or some other location.

In some instances, the acceleration service listing may be dynamically discovered. For instance, the ASM executing on HW accelerator card 418 may communicate with HW Accelerator cards locally attached to computing device 410 and/or other HW Accelerator cards of computing devices connected to the network 470. During the communications, HW Accelerator card 418 may request a listing of acceleration services provided by the other locally or remotely connected HW accelerators. The HW accelerator card 418 may aggregate these other acceleration services into acceleration listing 510. In some instances, HW accelerator cards may maintain separate acceleration listings for each other locally or remotely connected HW accelerator cards. For instance, although FIG. 5 illustrates only a single listing 510 for computing device 410, computing device 410 may have a listing for acceleration service provided by HW accelerator card 418 and a separate listing for acceleration services provided by other remotely connected HW accelerator cards. Although the foregoing examples describe discovering and aggregating acceleration service by an ASM program executing on HW accelerator card 418, other HW accelerator cards, such as accelerator cards 428, 438, and/or 448 may also prepare a listing of acceleration services available to their respective computing devices 420-440.

The ASM executing on HW accelerator card 418 may manage the acceleration service listing. In this regard, the ASM may determine which acceleration services are healthy (e.g., operational, available to process workloads, have sufficient processing capabilities for workloads, etc.) The ASM may monitor the operation of the acceleration services in the acceleration service listing to determine the state of the acceleration services (e.g., healthy, unhealthy/busy, unavailable, etc.) For instance, the ASM may request status updates from other ASMs to determine the status of the acceleration services offered by those other HW accelerator cards. The ASM may prune the acceleration service listing to remove acceleration services identified by the other ASMs as unavailable (e.g., not reachable). In another example, the ASM may mark acceleration services identified as being unhealthy (e.g., operating inefficiently/slowly,) or busy (e.g., processing other workloads, reserved for other workloads, etc.,) so that the ASM does not send workloads to these busy/unhealthy acceleration services.

In another example, the ASM may monitor workloads sent for completion or respond indicators. If no response is received, or a workload completion is not identified by the ASM, the ASM may determine the workload was not received by the remote HW accelerator and/or not processed by the intended acceleration service offered by the remote HW accelerator. In such a case, the ASM may request a different acceleration service perform the workload.

In some instances, the ASM may distribute a workload to multiple acceleration services for load balancing, failure handling, performance or other such considerations. For instance, the workload may be large, and the ASM may leverage the acceleration services of many HW accelerator cards to efficiently handle the workload. In another example, the ASM may priorities certain remote HW accelerator cards. For instance, the ASM may instruct the workload to be processed by a first remote HW accelerator. If the first remote HW accelerator is unable to process the workload, a second remote HW accelerator may handle the workload. This process may repeat, with additional fallback HW accelerators being instructed to process the workload until the workload is processed.

As part of the initialization of a HW accelerator card, the ASM executing on the compute complex may prepare services for sending and receiving calls for service, both locally and remotely. In this regard, ASM may initialize and/or confirm that end service code is enabled for handling local service calls (e.g., a call for processing by an accelerator of the HW accelerator card the ASM is executing on).

The ASM may also initialize and/or confirm that proxy code for remote services is enabled. Proxy code may be used as an intermediary for calling into remote services (e.g., a call sent from the ASM to another ASM for processing by an accelerator of another HW accelerator card) is enabled. In this regard, proxy code refers to code that enables ASM to ASM communication. Proxy code may also refer to code that enables the ASM of a local HW accelerator card to call acceleration services from accelerators on other, remote HW accelerator cards for which there may be no ASM running That is to say, the ASM of the local HW accelerator card, through proxy code, may be configured to route requests for acceleration services from a local computing device to a remote HW accelerator card, when the remote HW accelerator card does not include ASM.

The ASM may expose the acceleration service listing to the processor of the computing device. For instance, the ASM executing on HW accelerator card 418 may provide listing 510 to a processor or processors of computing device 410. In some instances, an operating system executing on a computing device may request the listing from the ASM. For instance, an operating system executing on computing device 410 may request the listing of acceleration services 510 from HW accelerator card 418.

Example Methods

Figure 6:
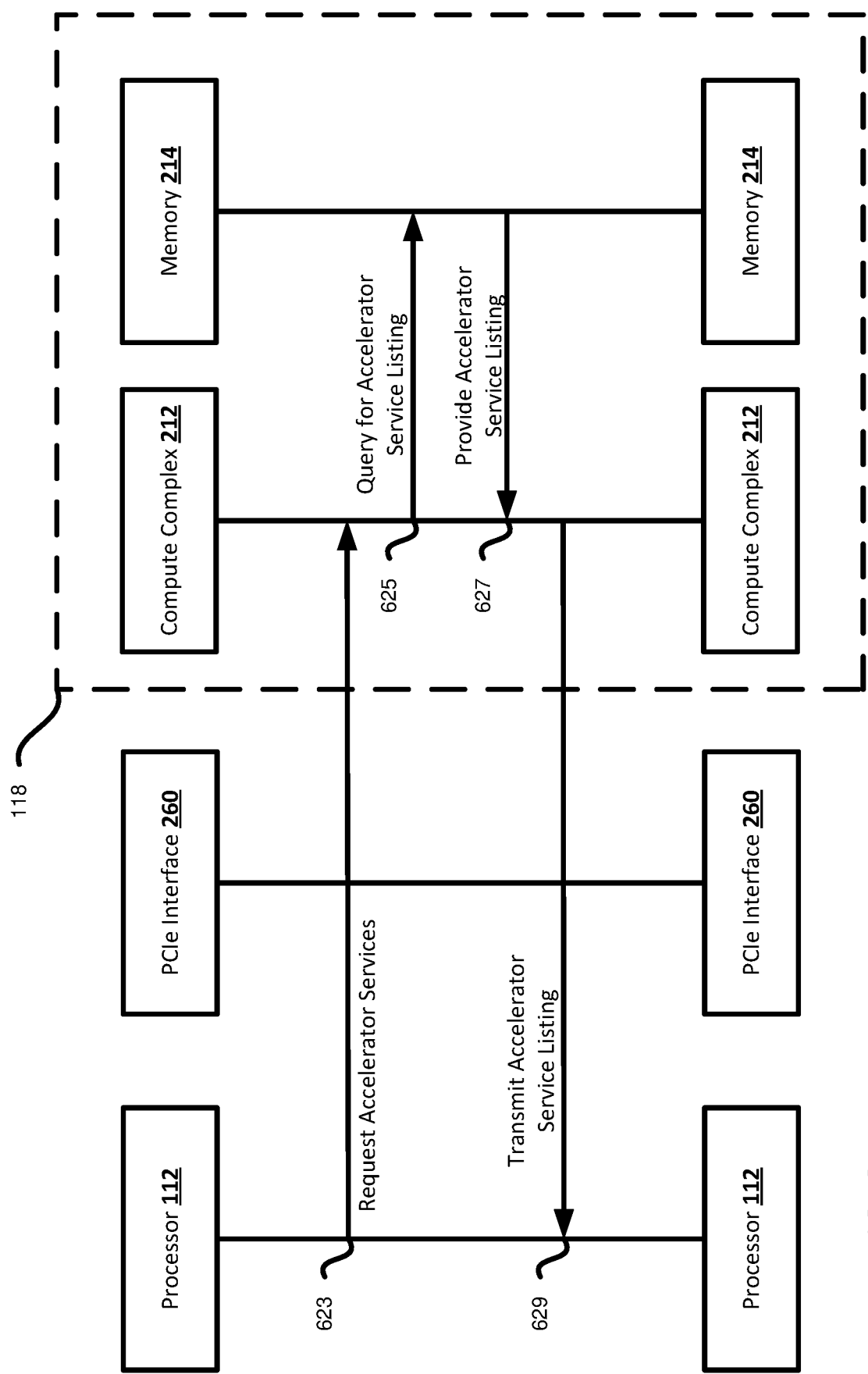
FIG. 6 is a flow diagram of an example process for requesting acceleration services from a hardware accelerator card in accordance with aspects of the disclosure.

FIG. 6 is a flow diagram illustrating the process of discovering acceleration services provided by a HW accelerator card, such as HW accelerator card 118 connected to a processor, such as processor 112 via a communication interface, such as PCIe bus 260. The processor 112 may request to communicate with the HW accelerator card 118 (shown in dashed line) via the PCIe interface. The operating system executing on the computing device may provide a communication channel over the PCIe bus between the HW accelerator card and processor 112.

Using the communication channel, the processor 112 may transmit a request for a listing of acceleration services provided by the accelerators on the HW accelerator card 118, as shown by line 623. In response to receiving the request from the processor 118, the compute complex 212 of the HW accelerator card 118 may query and receive a listing of acceleration services from memory 214 of the HW accelerator card (or memory of the accelerators), as illustrated by arrows 625 and 627, respectively. In this regard, the HW accelerator card may aggregate the acceleration services of all accelerators. In certain instances, the HW accelerator card 118 may query only some accelerators.

In some instances, the HW accelerator card 118 may aggregate the acceleration services of the accelerators in a hierarchical manner. In this regard, acceleration services may be hierarchical, in that one acceleration service may rely on or be dependent on another acceleration service. This hierarchical relationship between acceleration services may be identified and stored in this listing. In some instances, each level in the hierarchical relationship may identify the capabilities and functionalities of the levels underneath.

The compute complex 212 may provide the listing of acceleration services to the processor 112 via the PCIe bus 260, as shown by line 629. Once the processor receives the listing of acceleration services, the communication channel may be closed.

Figure 7:
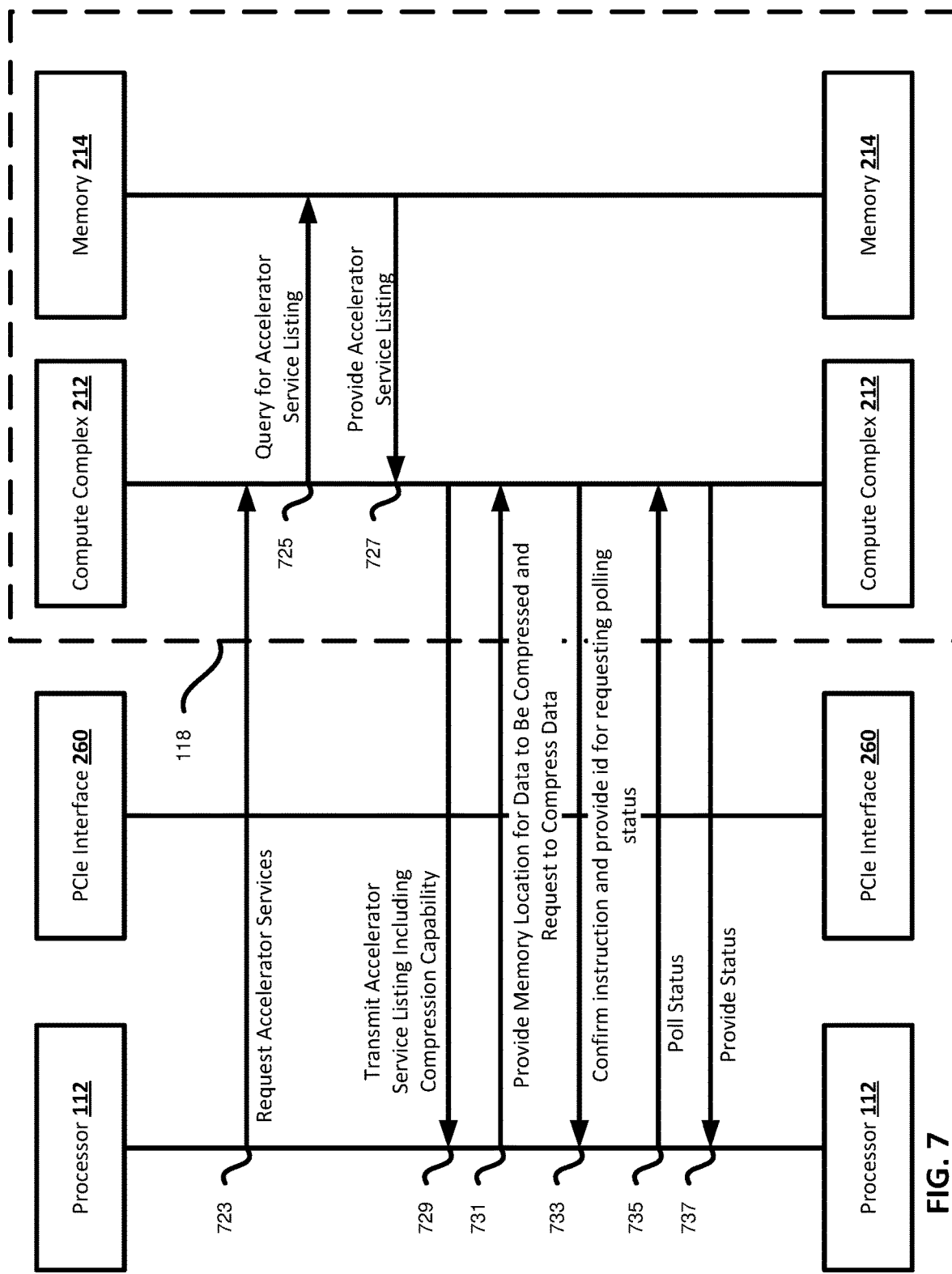
FIG. 7 is another flow diagram of an example process for requesting acceleration services from a hardware accelerator card and providing a workload to leverage the acceleration services in accordance with aspects of the disclosure.

In the event the processor can leverage one or more acceleration services, the processor 112 may request the HW accelerator card complete one or more tasks using one of the provided acceleration services offered by the accelerators on the HW accelerator card 118. FIG. 7 illustrates a processor 112 requesting information regarding the acceleration services of a HW accelerator card 118 connected via PCIe bus 260. In this regard, steps 723-729 correspond to steps 623-629 described above.

As illustrated by arrow 729, the HW accelerator indicates that it is capable of providing compression services. Upon receiving the acceleration services, the processor 112 may provide a workload instruction including an indication of a location storing data and an instruction to the HW accelerator card 118 to compress the data, as shown by arrow 731. The compute complex 212 of the HW accelerator card may then confirm the instruction and provides an ID that the processor 112 may communicate with to get status updates on the compression by the HW accelerator card 118 as shown by arrow 733. The processor 112 may then request and receive a status of the compression as shown by arrows 735 and 737, respectively. Once a polling request indicates that compression is complete, communication between the processor 112 and HW accelerator card 118 may cease or further tasks may be sent from the processor 112 to the HW accelerator card. Although FIG. 7 illustrates a compression service, the processing performed by the HW accelerator can be any type of operation or combination of operations.

Figure 8:
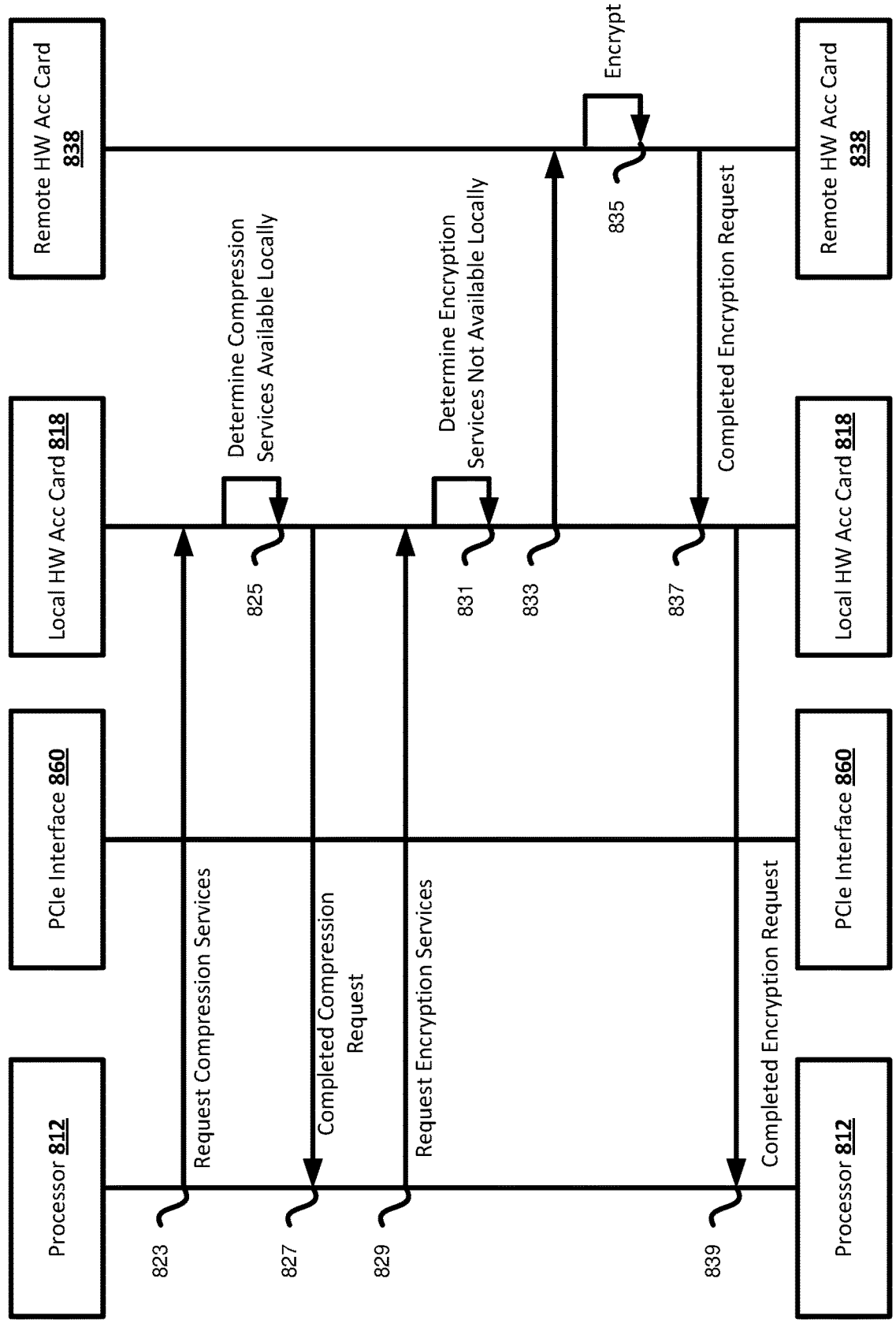
FIG. 8 is a flow diagram of an example process for requesting acceleration services from remote and local hardware accelerator cards in accordance with aspects of the disclosure.

FIG. 8 illustrates a flow diagram of the service aggregation operation. Software running on a processor 812 of a computing device may request an acceleration service or services from a HW acceleration card 818 to process a workload. The request, illustrated by line 823, may be sent by the processor 812 to the local HW accelerator card 818 through a communication link established through a communication interface, such as PCE Interface 860. For purposes of illustration, the acceleration service being requested by processor 812 is a "compression" service to process the workload. However, any other acceleration service may be requested.

Before sending request 823, the software executing on processor 812 may be provided with a listing of acceleration services available locally (i.e., by the accelerators of HW accelerator card 818) or remotely (i.e., by other remote accelerators of HW accelerators connected via a network,) from HW accelerator card 818. For example, this listing may be provided during the initialization of HW accelerator card 818. In another example, the software or another program, such as an operating system, executing on the computing device may request the listing. In yet another example, the listing of acceleration services may be received by the software from a configuration system without communication with HW accelerator card 818. The configuration system may be a centralized listing, from where software executing on the computing device may retrieve the listing. For instance, the configuration system may be remotely located, with storage accessible via the network or other connection.

Request 823 may include the name (e.g., unique identifier) of the acceleration service being requested, in-line parameters, and pinned memory location(s) where the input (e.g., data for processing the workload) for the requested acceleration service(s) is found.

After receiving the request, the ASM of HW accelerator card 818 may determine if the requested acceleration service is local, as shown by line 825. In the event the acceleration service is local, the ASM may service the request using in-line parameters and accessing the passed memory address using DMA (direct memory access). The local accelerator capable of executing the requested acceleration service may then process the input (e.g., data). Referring again to FIG. 8, the requested compression acceleration service may be conducted by an accelerator of HW accelerator card 818. The results (e.g., output) of the completed compression request may then be passed from the HW accelerator card 818 to processor 812, as illustrated by line 827.

In instances where the requested acceleration service is not available locally, the ASM may acts as a requesting client to the remote service HW accelerator card. In this regard, the ASM of HW accelerator card may pass the request to the remote HW accelerator card that provides the requested acceleration service. The HW accelerator card may also pass the pinned memory through remote direct memory access (RDMA) to the remote HW accelerator cards.

FIG. 8 further illustrates a flow of a remote service aggregation operation. For instance, processor 812 may request encryption acceleration services, provided by remote HW accelerator card 838, to local HW accelerator card 818, as illustrated by line 829. After receiving the request, the local HW accelerator card 818 may determine encryption is not an acceleration service it provides, as illustrated by line 831.

When the local HW accelerator card is not able to complete an acceleration service, the ASM of local HW accelerator card 818 may determine which remote HW accelerator card may be capable of providing the service. Referring to FIG. 8, ASM of local HW accelerator 818 may determine that remote HW accelerator card 838 is capable of providing the encryption acceleration service. The ASM may forward the request, as shown by line 833.

In some instances, the request may include an identifier of the HW accelerator card capable of providing the acceleration service. In such cases, the local HW accelerator card 818 may skip determining whether it performs the requested acceleration service and proceed with forwarding the request to the identified remote HW accelerator card.

The remote HW accelerator card 838 may then perform the acceleration service of encryption, illustrated by line 835 in FIG. 8. The completed encryption results (e.g., output) may then be passed from the remote HW accelerator card 838 to local HW accelerator card 818, as illustrated by line 837 processor 812, and from the local HW accelerator card 818 to processor 812, as illustrated by line 839.

Communication between HW accelerator cards may be done through ASM programs executing on each HW accelerator card. In this regard, each ASM may communicate directly. Alternatively, the ASMs may encapsulate communication data (e.g., requests, output, etc.,) into data packets within an outer header that can route the packet to a remote routable destination, the address for which could be discovered via regular routing. Once the packet reaches the intended ASM, the ASM could decapsulate the packet and direct the packet to the right accelerator on that HW accelerator card, as identified in the packet header.

Unless otherwise stated, the foregoing alternative examples are not mutually exclusive but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
generating, by an accelerated services manager (ASM) executing on one or more processors of a local hardware (HW) accelerator card, a first set of acceleration services provided by one or more accelerators of the local HW accelerator card;
receiving, by the ASM, from another ASM executing on a remote HW accelerator card, a second set of acceleration services provided by one or more accelerators of the remote HW accelerator card;
providing, by one or more processors of a local hardware (HW) accelerator card, via a communication interface, a listing of acceleration services from the local HW accelerator card, the listing of acceleration services including the first set of acceleration services and the second set of acceleration services;
receiving, by the one or more processors, a workload instruction from a processor of a computing device, the workload instruction defining a workload for processing by at least one of the acceleration services of the second set of acceleration services;
forwarding, by the ASM, the workload instruction to the remote HW accelerator card; and
after determining a failure to process the workload instruction by the remote HW accelerator card, sending, by the ASM, an updated workload instruction to a different HW accelerator card for processing by at least one acceleration service of the different HW accelerator.

2. The method of claim 1, further comprising:
receiving, by the one or more processors, a processed workload from the remote HW accelerator card, the processed workload being the workload after processing by the at least one of the acceleration services of the second set of acceleration services.

3. The method of claim 2, further comprising:
forwarding, by the one or more processors, the processed workload to the processor of the computing device.

4. The method of claim 1, wherein forwarding the workload instruction to the remote HW accelerator card comprises sending the workload instruction to the other ASM.

5. The method of claim 1, wherein prior to receiving the second set of acceleration services, the ASM requests a listing of the second set of acceleration services from the other ASM.

6. The method of claim 1, wherein the ASM identifies and prunes unhealthy acceleration services from the listing of acceleration services.

7. The method of claim 6, wherein identifying the unhealthy acceleration services includes:
determining, by the ASM, the failure to process the workload instruction by the at least one of the acceleration services of the second set of acceleration services.

8. The method of claim 7, wherein pruning the unhealthy acceleration services includes:
marking the at least one of the acceleration services of the second set of acceleration services as unhealthy; or
removing the at least one of the acceleration services of the second set of acceleration services from the listing of acceleration services.

9. The method of claim 1, wherein the workload instruction further defines processing by at least one acceleration service of at least one other remote HW accelerator card.

10. A system comprising:
- a communication interface;
- a local hardware (HW) accelerator card including one or more processors and one or more accelerators, the one or more processors configured to:
  - generate, by an accelerated services manager (ASM) executing on the one or more processors a first set of acceleration services provided by the one or more accelerators;
  - receiving, by the ASM, from another ASM executing on a remote HW accelerator card, a second set of acceleration services provided by one or more accelerators of the remote HW accelerator card;
  - provide, via the communication interface, a listing of acceleration services from the local HW accelerator card, the listing of acceleration services including the first set of acceleration services and the second set of acceleration services;
  - receive a workload instruction from a processor of a computing device, the workload instruction defining a workload for processing by at least one of the acceleration services of the second set of acceleration services;
  - forward, by the ASM, the workload instruction to the remote HW accelerator card; and
  - send, by the ASM after determining a failure to process the workload instruction by the remote HW accelerator card, an updated workload instruction to a different HW accelerator card for processing by at least one acceleration service of the different HW accelerator.

11. The system of claim 10, wherein the one or more processors are further configured to:
- receive a processed workload from the remote HW accelerator card, the processed workload being the workload after processing by the at least one of the acceleration services of the second set of acceleration services.

12. The system of claim 11, wherein the one or more processors are further configured to:
- forward the processed workload to the processor of the computing device.

13. The system of claim 10, wherein forwarding the workload instruction to the remote HW accelerator card comprises sending the workload instruction to the other ASM.

14. The system of claim 10, wherein prior to receiving the second set of acceleration services, the ASM requests a listing of the second set of acceleration services from the other ASM.

15. The system of claim 10, wherein the ASM identifies and prunes unhealthy acceleration services from the listing of acceleration services.

* * * * *